United States Patent
Imura et al.

(10) Patent No.: US 7,455,143 B2
(45) Date of Patent: Nov. 25, 2008

(54) VEHICLE DRIVE UNIT

(75) Inventors: Shinya Imura, Toride (JP); Takehiko Kowatari, Kashiwa (JP); Tatsuyuki Yamamoto, Mito (JP); Masaru Ito, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 358 days.

(21) Appl. No.: 11/340,480

(22) Filed: Jan. 27, 2006

(65) Prior Publication Data

US 2007/0095585 A1     May 3, 2007

(30) Foreign Application Priority Data

Oct. 24, 2005    (JP)        ............... 2005-307953

(51) Int. Cl.
       *B60K 17/356*        (2006.01)
(52) U.S. Cl. .................. 180/242; 180/65.1; 180/197; 180/305
(58) Field of Classification Search ................ 180/65.1, 180/305, 242, 197
See application file for complete search history.

(56) References Cited

U.S. PATENT DOCUMENTS

| | | | |
|---|---|---|---|
| 3,967,862 A | 7/1976 | Hunter et al. | |
| 4,554,990 A | 11/1985 | Kamiya et al. | |
| 4,733,760 A | 3/1988 | Inagaki et al. | |
| 6,113,517 A * | 9/2000 | Salecker et al. | ............. 477/174 |
| 6,405,701 B1 * | 6/2002 | Masberg et al. | .......... 123/192.1 |
| 6,742,639 B2 * | 6/2004 | Aikawa et al. | ............. 192/3.61 |
| 7,121,975 B2 * | 10/2006 | Tomura et al. | ................. 477/2 |
| 7,206,702 B2 * | 4/2007 | Isono et al. | .................... 702/41 |
| 2004/0142790 A1 * | 7/2004 | Tomura et al. | ................. 477/2 |
| 2005/0012501 A1 * | 1/2005 | Isono et al. | ................. 324/300 |
| 2005/0139400 A1 * | 6/2005 | Gee | ......... 180/65.2 |
| 2007/0095589 A1 * | 5/2007 | Tamai et al. | ................ 180/197 |
| 2007/0265751 A1 * | 11/2007 | Tsuchiya | ..................... 701/41 |

FOREIGN PATENT DOCUMENTS

| | | |
|---|---|---|
| EP | 0 125 659 A2 | 11/1984 |
| EP | 0 354 790 A2 | 2/1990 |
| GB | 2 343 428 A | 5/2000 |
| JP | A-08-182119 | 12/1996 |

OTHER PUBLICATIONS

European Search Report dated Feb. 28, 2007 (Five (5) pages).

* cited by examiner

*Primary Examiner*—Paul N Dickson
*Assistant Examiner*—Tashiana Adams
(74) *Attorney, Agent, or Firm*—Crowell & Moring LLP

(57) ABSTRACT

A vehicle drive unit, for quickly recovering a grip even if a wheel slips, in which in a slip state or at a time when the slip state is going to be generated, by pulsating a torque applied to the wheel, an angular velocity W of the wheel is changed so as to change the slip ratio S close to a slip ratio at which a friction coefficient becomes maximum, and thus, an average of a friction coefficient $\mu$ is enlarged and an average of a vehicle driving force F generated by a wheel is enlarged. Since the vehicle driving force is enlarged, the vehicle is accelerated and is easily gripped. Further, in a grip state or at a time of traveling at a high velocity, a vibration and an undesired sound are suppressed by doing away with the torque pulsation or making the fluctuation band of the torque pulsation small.

10 Claims, 6 Drawing Sheets

TORQUE PULSATION : NO

TORQUE PULSATION: LARGE

TORQUE PULSATION : SMALL

TORQUE PULSATION : LARGE

VEHICLE DRIVE UNIT

FIELD OF THE INVENTION

The present invention relates to a drive unit of a vehicle such as a motor vehicle or the like, and more particularly to a way for applying a power to a wheel and a structure for applying the power.

DESCRIPTION OF THE RELATED ART

As a drive system for securing a traveling performance at a time of traveling on a road surface having a small friction coefficient such as a snowy road and a frozen road surface, there is, for example, a method disclosed in JP-A-8-182118. In this method, it is judged whether or not the wheel slips while driving the wheel by a motor so as to travel. If the slip is judged to be generated, a process of reducing a torque command value to the motor a little is conducted. This process is repeated to continuously get down the torque command value to the motor until no slip is judged in the slip judgment.

However, in the method of reducing the motor torque step by step until the wheel grips the road surface, while executing the slip judgment as in the drive method mentioned above, it takes a long time for the wheel to grip the road surface. Accordingly, a drive feeling is deteriorated, and if the tire keeps slipping, snow and ice thaw to form a water screen. Therefore, the water screen makes the friction coefficient becomes small, and thus, a generated vehicle driving force becomes small, so as to deteriorate a climbing performance and an accelerating performance.

BRIEF SUMMARY OF THE INVENTION

An object of the present invention is to provide a vehicle drive unit which can quickly make the wheel recover a grip even if the wheel slips.

A vehicle drive unit in accordance with the present invention is provided with a power source which can pulsate a generated torque, or a power transmission means which can pulsate a torque transmitted to a wheel.

Further, a vehicle drive unit in accordance with the present invention is provided with a power source which can change a fluctuation band of a generated torque pulsation during a travel or at each travel, or a power transmission means which can change a fluctuation band of a torque pulsation transmitted to a wheel.

Further, a vehicle drive unit in accordance with the present invention is provided with a slip detection means, for enlarging the fluctuation band of the torque pulsation applied to the wheel at a time when the wheel slips.

Further, a vehicle drive unit in accordance with the present invention is provided with a vehicle start detection means, for enlarging the fluctuation band of the torque pulsation applied to the wheel at a time when the vehicle starts.

Further, a vehicle drive unit in accordance with the present invention is provided with a grip detection means, for reducing the fluctuation band of the torque pulsation applied to the wheel after the wheel grips from a state in which the fluctuation band of the torque pulsation of the wheel is enlarged.

Further, a vehicle drive unit in accordance with the present invention is provided with a vehicle velocity detection means or a wheel velocity detection means, for reducing the fluctuation band of the torque pulsation applied to the wheel after the vehicle or the wheel goes beyond a predetermined velocity from a state in which the fluctuation band of the torque pulsation of the wheel is enlarged.

Further, a vehicle drive unit in accordance with the present invention is provided with an elapsed time calculation means, for reducing the fluctuation band of the torque pulsation applied to the wheel after a fixed time has elapsed from the enlargement of the fluctuation band of the torque pulsation of the wheel.

Further, a vehicle drive unit in accordance with the present invention is provided with a torque pulsation change switch in a driver seat or the like, for a driver changing the fluctuation band of the torque pulsation which is applied to the wheel.

Further, a vehicle drive unit in accordance with the present invention is provided with a power source of an alternating motor which can change the fluctuation band of the torque pulsation applied to the wheel by changing a drive wave form.

Further, a vehicle drive unit in accordance with the present invention is provided with a power source of an electric motor which can change the fluctuation band of the torque pulsation applied to the wheel by changing a number of stators in which an electric current circulates.

Further, a vehicle drive unit in accordance with the present invention is provided with a power source of two or more electric motors, and a means for changing a phase with respect to an output shaft of at least one electric motor, for changing the fluctuation band of the torque pulsation applied to the wheel, by intensifying cogging torques of two or more electric motors with each other so as to drive one output shaft, or by negating the cogging torques with each other so as to drive one output shaft.

Further, a vehicle drive unit in accordance with the present invention is provided with a power source or a power transmission means which can pulsate a velocity of the wheel.

In accordance with the present invention, it is possible to enlarge the vehicle driving force by pulsating the torque applied to the wheel under the slip state. Further, there is obtained an effect that the enlargement of the vehicle driving force makes to accelerate the vehicle and thus, the wheel can easily grip the road surface. Further, it is possible to suppress a vibration and an undesired sound in the grip state or at a time of traveling at a high velocity.

Other objects, features and advantages of the invention will become apparent from the following description of the embodiments of the invention taken in conjunction with the accompanying drawings.

DETAILED DESCRIPTION OF THE INVENTION

Figure 1:
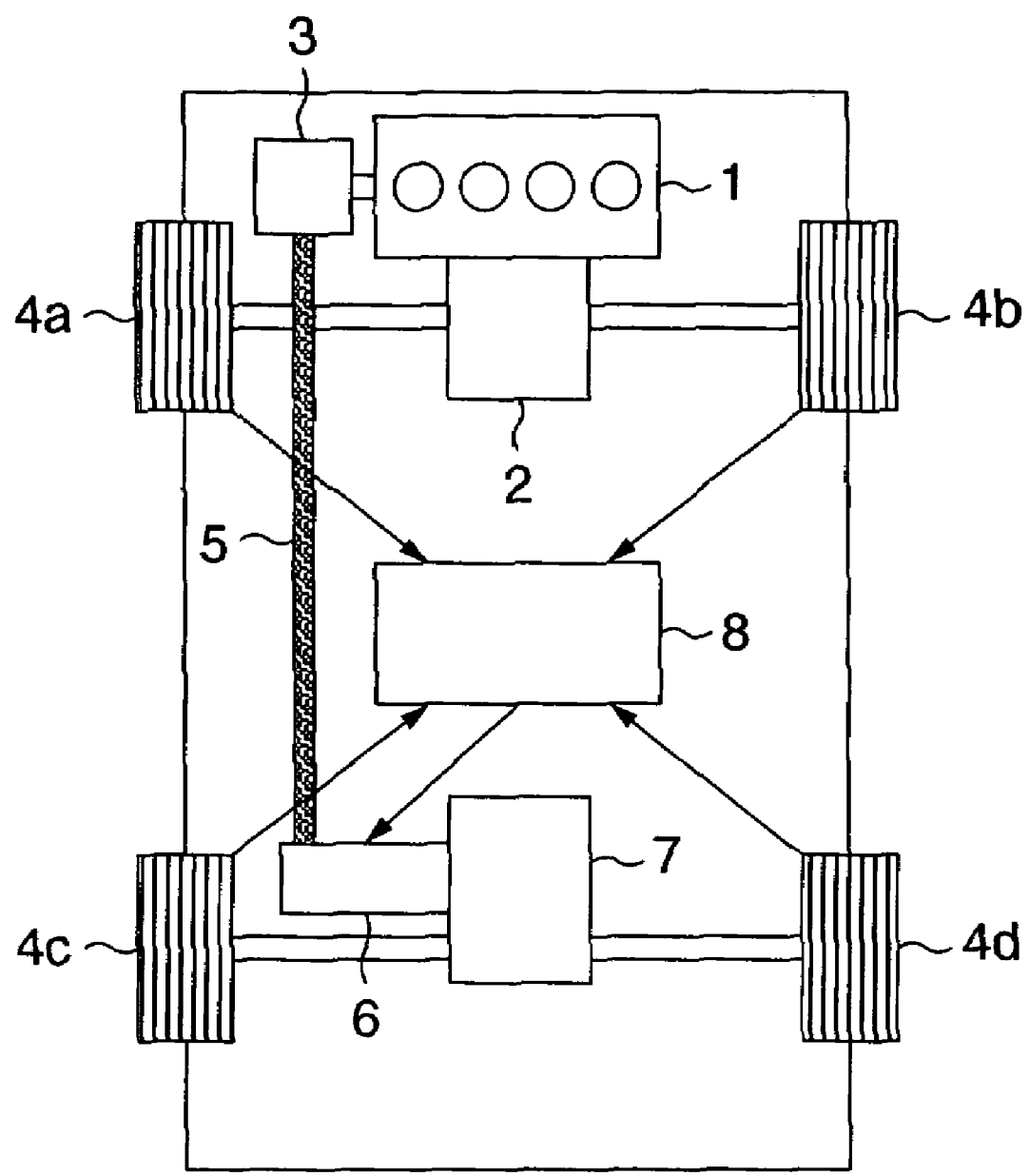
FIG. 1 shows an example of a vehicle to which the present invention is applied.

An example of a vehicle to which the present invention is applied is shown in FIG. 1. A description will be given below of the vehicle in FIG. 1. A power generated by an engine 1 is transmitted to a transmission 2 and a power generator 3. The power transmitted to the transmission 2 is divided into left and right so as to be transmitted to front wheels 4a and 4b. The power generator 3 executes a power generation by using the power transmitted from the engine 1, and supplies an electric power to a motor 6 via a power line 5. The motor 6 generates a power on the basis of the electric power supplied from the power generator 3. The power generated in the motor 6 is transmitted to a rear differential 7. The power transmitted to the rear differential 7 is divided into left and right so as to be transmitted to rear wheels 4c and 4d. A motor controller 8 controls the motor 6 on the basis of the method mentioned below in correspondence to velocitys of the wheels 4a, 4b, 4c and 4d.

On the road surface such as a dry road surface in which a friction coefficient is sufficiently large, a slip is hardly generated between the wheel and the road surface in most cases (hereinafter, this state is called as a grip state). In the grip state, most of the power transmitted to each of the wheels 4a, 4b, 4c and 4d is converted into a force for propelling the vehicle (hereinafter, called as a vehicle driving force).

However, on the road surface such as a snowy road and a frozen road surface in which the friction coefficient is small, there is a case that the slip is generated between the wheel and the road surface (hereinafter, this state is called as a slip state). In the slip state, the power transmitted to each of the wheels 4a, 4b, 4c and 4d is limited to be converted into the vehicle driving force only to a maximum friction force between each of the wheels and the road surface, and the remaining power is used for making the wheel run idle. Accordingly, a climbing performance and an accelerating performance are deteriorated in the slip state.

It has been known that a friction coefficient $\mu$ between the wheel and the road surface is changed on the basis of a slip ratio S. The slip ratio S is expressed by the expression $S=(R \times W-V)/(R \times W)$ in which a dynamic radius of the wheel is set to R, an angular velocity of the wheel is set to W, and a velocity of an entire vehicle is set to V. An example of a relation between the friction coefficient $\mu$ between the wheel and the road surface, and the slip ratio S is shown in FIG. 2.

Figure 2:
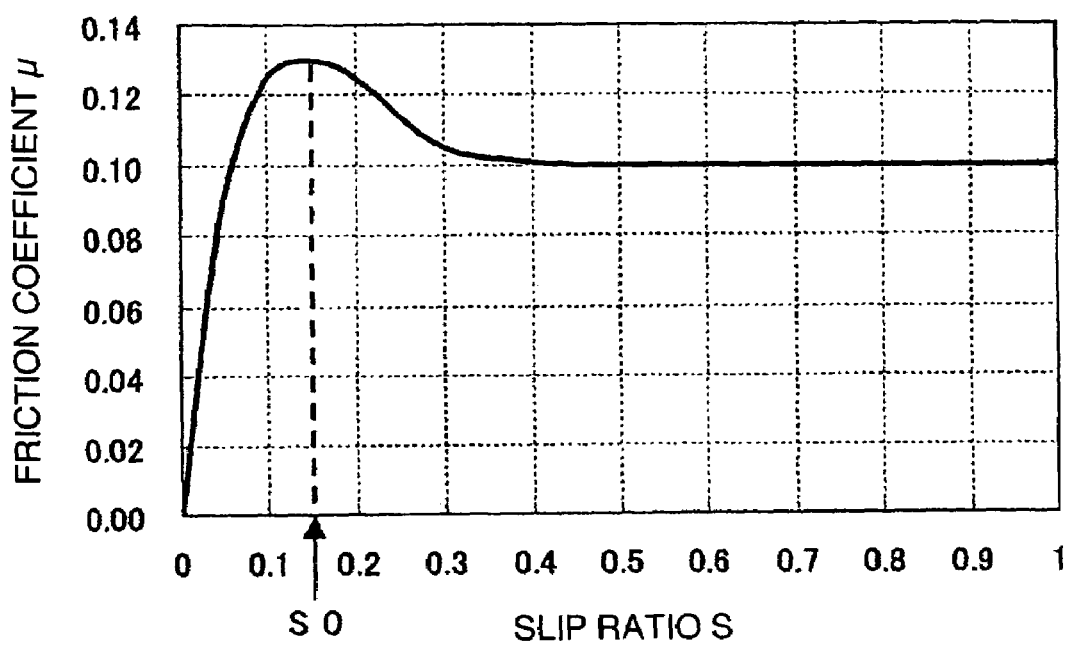
FIG. 2 shows an example of a relation between a friction coefficient between a wheel and a road surface, and a slip ratio.

As shown in FIG. 2, in most cases, the friction coefficient $\mu$ becomes maximum at a certain slip ratio S0, and becomes approximately constant if the slip ratio S becomes larger than S0. The slip ratio S0 at which the friction coefficient becomes maximum varies according to the states of the wheel and the road surface, but, it has been known that the slip ratio S0 is in a range of approximately 0.1 to 0.2.

In order to maximize the climbing performance and the accelerating performance of the vehicle, it is preferable to adjust the power transmitted to each of the wheels and adjust the angular velocity W of each of the wheels in such a manner that the slip ratio of each of the wheels becomes S0. However, since the value of S0 varies according to the states of the wheel and the road surface, it is impossible to accurately know the value. Further, since the vehicle velocity V is estimated on the basis of a wheel velocity and a rotating velocity of the power transmission shaft in the general vehicle, it can not be accurately known in a state that the wheel slips and runs idle, in most cases.

Then, in accordance with the present invention, at a time of the slip state or at a time when the slip state is going to be generated, the motor controller 8 controls the motor 6 in such a manner that the torque pulsates, so as to make the torque applied to the rear wheels 4c and 4d pulsate, thereby changing the angular velocity W of the rears wheels 4c and 4d, changing the slip ratio S, and making the slip ratio S close to the slip ratio S0 at which the friction coefficient becomes maximum so as to enlarge an average of the friction coefficient $\mu$, and enlarge an average of a vehicle driving force F generated by the rear wheels 4c and 4d. A description will he given below of this phenomenon on the basis of a case of climbing up on a sloping road having a small friction coefficient.

Figure 3:
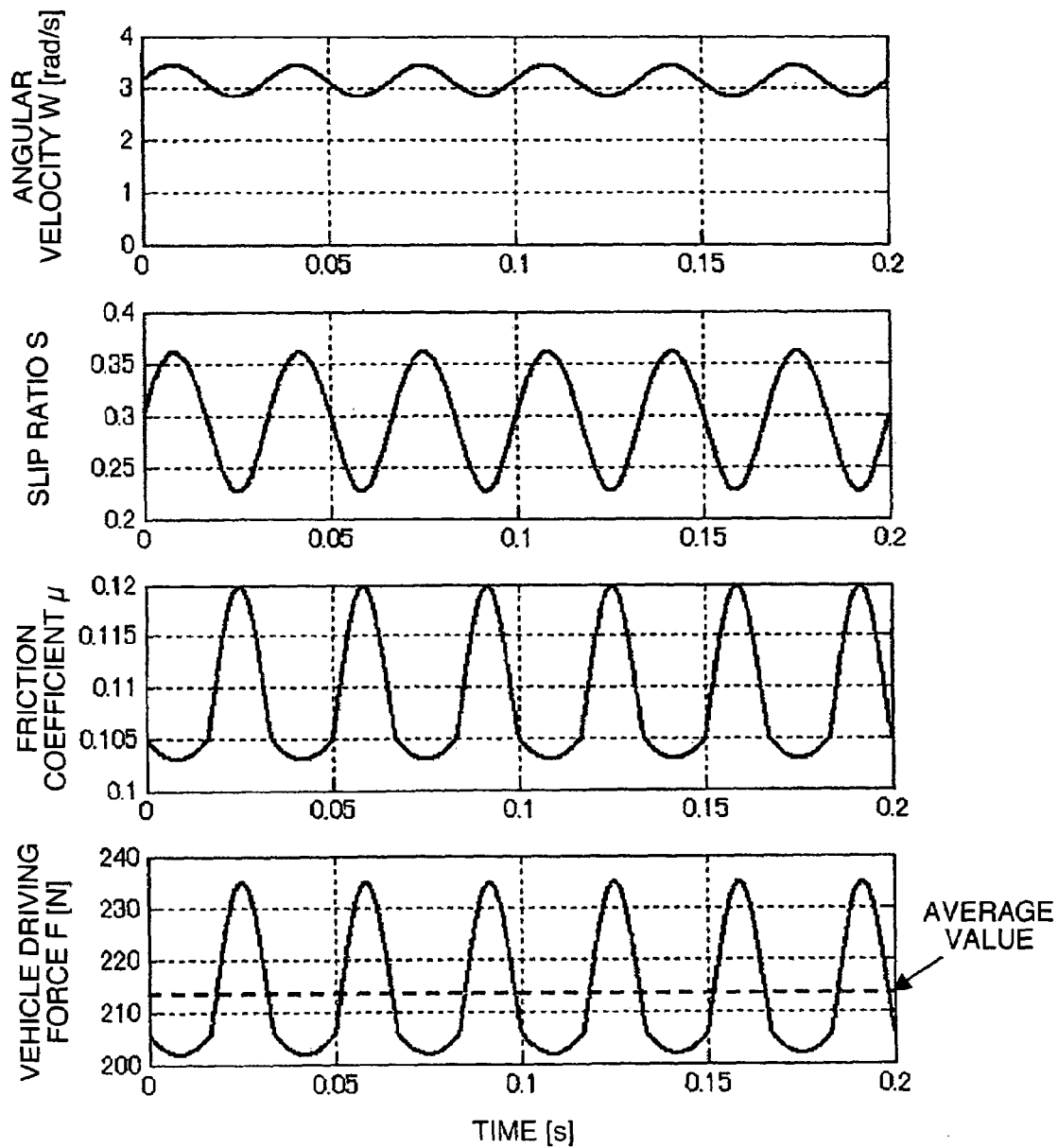
FIG. 3 shows an example of an angular velocity, a slip ratio and a friction coefficient of a wheel and a vehicle driving force generated by the wheel, at a time of pulsating a torque applied to the wheel on a climbing road having a small friction coefficient.

FIG. 3 shows an example of the angular velocity W, the slip ratio S and the friction coefficient $\mu$ of the rear wheels 4c and 4d, and the vehicle driving force F per one wheel generated by the rear wheels 4c and 4d, at a time of making the torque applied to the rear wheels 4c and 4d pulsate. Incidentally, in this example, a condition is assumed that a total of the vehicle driving forces generated by all the wheels approximately balances with a force that the vehicle is returned back in a downward direction of the slope by gravitation, and that the vehicle velocity V becomes approximately fixed.

With reference to FIG. 3, it is known that the slip ratio S is changed in the same manner as the fluctuation of the angular velocity W, and the friction coefficient $\mu$ and the vehicle driving force F are enlarged at a time when the slip ratio S becomes close to the S0 (0.15 in this example). An average value of the vehicle driving force F in FIG. 3 is about 214 N.

Figure 4:
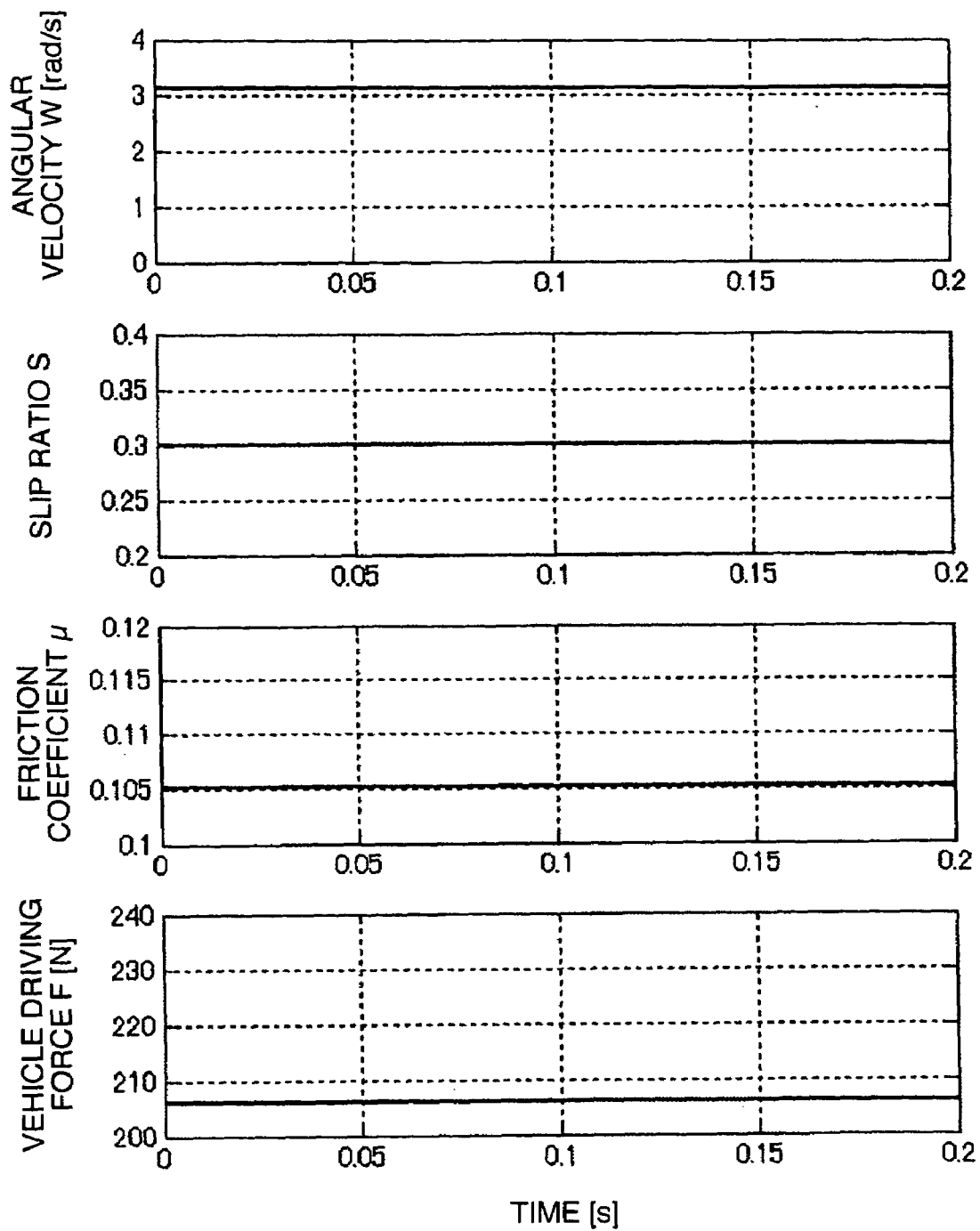
FIG. 4 shows an example of a case that the torque applied to the wheel is not pulsated, in a state in which an average of the angular velocities of the wheels and the vehicle velocity are identical with those in FIG. 3.

For reference, FIG. 4 shows an example of a case that the average of the angular velocity W of the wheel and the vehicle velocity V are identical to those in FIG. 3, and the torque applied to the rear wheels 4c and 4d is not made to pulsate. With reference to FIG. 4, it is known that since the angular velocity W is not changed, the slip ratio S is not changed, and the friction coefficient $\mu$ and the vehicle driving force F per one wheel become constant. The average of the vehicle driving force F in FIG. 4 is about 206 N, which is smaller than the value in FIG. 3.

As mentioned above, it is possible to enlarge the vehicle driving force by making the torque applied to the rear wheel pulsate and changing the angular velocity of the rear wheel, in the slip state. Further, there can be obtained an effect that the vehicle is accelerated so as to easy grip on the basis of the enlargement of the vehicle driving force.

Further, if the vehicle becomes in the gripping state, or in a condition such as a high velocity traveling time or the like in which the vibration and the undesired sound tend to be enlarged, the vibration and the undesired sound may be suppressed by doing away with the torque pulsation or making the fluctuation band of the torque pulsation small.

Further, as far as it is possible to enlarge the fluctuation band of the velocity pulsation of the wheel, the vehicle driving force becomes enlarged even if the fluctuation band of the torque pulsation is not enlarged. For example, if the torque pulsation is constituted by a wave form similar to a sine wave, an amplitude of the velocity becomes large by enlarging a cycle without changing the amplitude, and the same effect can be obtained.

In this case, FIG. 1. shows the example of the vehicle in which the front wheels are driven on the basis of the power mechanically transmitted from the engine, and the rear wheels are driven by the motor. However, the present invention can be applied to the other drive type vehicles. In other words, the present invention can be applied to a vehicle in which the front wheels are driven by the motor, and the rear wheels are driven by the power mechanically transmitted from the engine, a vehicle in which all the wheels are driven by the motor, a vehicle in which all the wheels are driven by the power mechanically transmitted from the engine, a vehicle in which only two front wheels or only two rear wheels are driven by the engine or the motor, and the power is not transmitted to the remaining two wheels, and the like.

Next, a description will be given of a method of changing the fluctuation width of the torque pulsation applied to the wheel.

In the case of driving the wheel by the motor, it is preferable to change the fluctuation band of the torque pulsation of the motor. Therefore, it is preferable to change an electric current circulating in a rotor coil or a stator coil of the motor. Further, a cogging torque of the motor may be utilized.

Figure 5A:
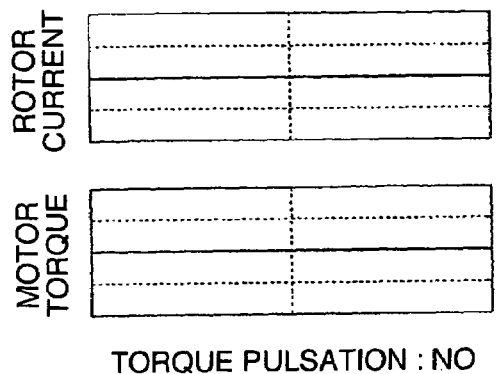
FIGS. 5A and 5B show an example of a method of changing a fluctuation band of a torque pulsation applied to the wheel.
Figure 5B:
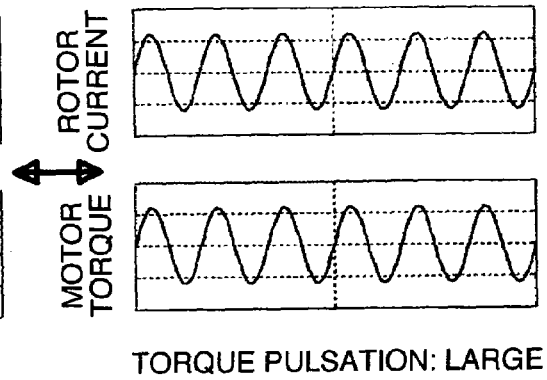

For example, in the case of a dc motor, it is possible to change the fluctuation band of the torque pulsation by changing the fluctuation band of the electric current circulating in the rotor coil, as shown in FIGS. 5A and 5B. If the fluctuation band of the electric current circulating in the rotor coil is enlarged, the fluctuation band of the torque pulsation becomes enlarged.

Figure 6A:
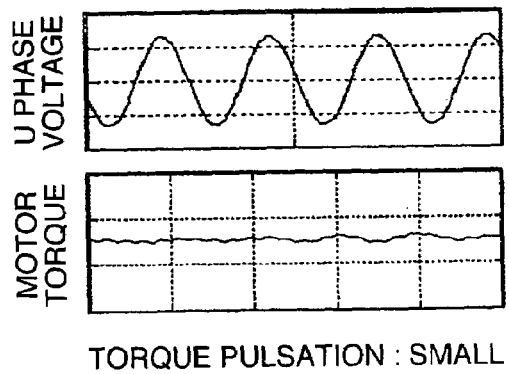
FIGS. 6A and 6B show another example of the method of changing the fluctuation band of the torque pulsation applied to the wheel.
Figure 6B:
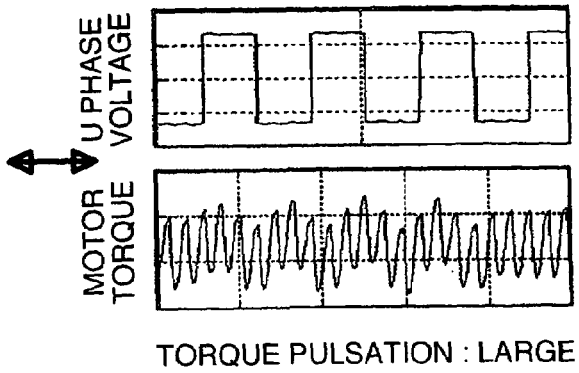

Further, in the case of an ac motor, it is possible to change the fluctuation band of the torque pulsation by changing the drive wave form, as shown in FIGS. 6A and 6B. For example, if a drive voltage of each of phases (U phase, V phase and W phase) is set to a rectangular wave, the fluctuation band of the torque pulsation becomes enlarged in comparison with a case that the drive voltage is constituted by the sine wave or PWM similar to the sine wave.

Further, in any motor of the dc motor and the ac motor, it is possible to change the fluctuation band of the torque pulsation by changing the number of the stators circulating the electric current. In the case that the fluctuation band of the torque pulsation is enlarged while keeping the average value of the torque, it is preferable to reduce the number of the stators circulating the electric current so as to enlarge the electric current circulating in the remaining stators.

Further, in the case of the system of driving one output shaft by the combination of the powers generated by two or more motors, and transmitting the power applied to the output shaft to the wheel, it is possible to change the fluctuation band of the torque pulsation by changing a phase relation between the motor shafts. If the motor shafts are arranged respectively at the phases intensifying the cogging torques of the respective motors with each other, the fluctuation band of the torque pulsation becomes large. If the phase relation of the motor shafts is changed by using a helical gear or the like, it is possible to intensify the cogging torques with each other or cancel the cogging torques with each other so as to change the fluctuation band of the torque pulsation.

In the case that the wheel is driven by the power mechanically transmitted from the engine, it is preferable to change the fluctuation band of the torque pulsation of the engine. For example, the fluctuation band of the torque pulsation can be changed by changing an ignition timing of each of the cylinders, setting a cylinder which is not ignited, or changing a fuel injection amount per cylinder.

Further, whichever case the wheel is driven by the engine or the motor, the fluctuation band of the torque pulsation can be enlarged by finely changing a pressing force (a coupling force) for a clutch, as far as the clutch (including a lockup clutch of an automatic transmission) is provided in a transmission path of the power.

Further, if a brake is provided in the transmission path of the power or a brake attached to the wheel is used, it is possible to make the torque pulsate by applying a small braking force finely.

In this case, the fluctuation band of the torque pulsation may be based on a method of switching two or more previously set magnitudes, or gradually changing the magnitude.

Next, a description will be given of a method of detecting a slip state.

In the case that a G sensor or the like is mounted and a vehicle velocity V can be known even in a slip state, it is possible to judge that the wheel is in a slip state, if a product of an angular velocity W of the wheel and a dynamic radius R of the wheel, R×W is more than the vehicle velocity V at a certain degree. It is possible to determine the degree of the product of R×W being more than the value V at which the slip state is judged, by taking into consideration an accuracy of a sensor measuring the vehicle velocity, the wheel velocity or the like, and a velocity difference between inner and outer wheels at a time when the vehicle turns.

In the case that the vehicle velocity V is not known, it is possible to detect the slip state on the basis of a relation among a total value Tf of the torques applied to two front wheels, a total value Tr of the torques applied to two rear wheels, and angular velocities Wa, Wb, Wc and Wd of the respective wheels (Tr=0 in the case of the wheel in which only two front wheels are driven, and Tf=0 in the case of the vehicle in which only two rear wheels are driven). On the assumption that the dynamic radius of two front wheels is set to Rf, the dynamic radius of two rear wheels is set to Rr, and a total weight of the vehicle is set to M, a vehicle acceleration at a time when all the wheels are in the grip state becomes smaller than (Tf/Rf+Tr/Rr)/M except the case that the force is applied in a forward direction such as a downward slope or the like, an angular acceleration of the front wheels becomes smaller than (Tf/Rf+Tr/Rr)/M/Rf, and an angular acceleration of the rear wheel becomes smaller than (Tf/Rf+Tr/Rr)/M/Rr. Accordingly, in the case of the front wheels, it is possible to judge that the wheels are in the slip state in the case that the angular acceleration is larger at a certain degree than (Tf/Rf+Tr/Rr)/M/Rf. In the case of the rear wheels, it is possible to judge that the wheels are in the slip state in the case that the angular acceleration is larger at a certain degree than (Tf/Rf+Tr/Rr)/M/Rr. It is possible to determine the degree of the angular acceleration of the wheel being more than the reference values at which the slip state is judged, by taking into consideration the accuracy of the sensor measuring the torque, the wheel velocity or the like, the velocity difference between the inner and outer wheels at a time when the vehicle turns, a fluctuation of the dynamic radii Rf and Rr of the wheels, a fluctuation of the vehicle total weight M, and an influence in the case that force is applied in the forward direction such as the downward slope or the like.

Further, in the case that the angular acceleration of the wheel is larger than a previously set threshold value, it may be possible to judge that the wheel is in the slip state.

In the case of the vehicle in which only two front wheels or two rear wheels are driven by the engine or the motor, two wheels which are not driven only rotate in conformity with the motion of the entire vehicle, and hardly slip. Accordingly, in the case that the angular velocity of the wheels to be driven becomes larger at a certain degree than the angular velocity of the wheels which are not driven, it is possible to judge that the slip state is generated. It is possible to determine the degree of the angular velocity of the wheel to be driven being more than the angular velocity of the wheel which is not driven at which the slip state is judged, by taking into consideration the accuracy of the sensor measuring the vehicle velocity, and the velocity difference between the inner and outer wheels at a time when the vehicle turns.

Further, even in the vehicle in which all the wheels are driven, in the case that the torque applied to two front wheels or two rear wheels is larger than the torque applied to the other two wheels, it is possible to judge that the slip state is generated, in the case that the angular velocity of the wheels having the larger torque becomes more at a certain degree than the angular velocity of the wheels having the smaller torque.

Next, a description will be given of a timing for changing the fluctuation band of the torque pulsation.

Figure 7:
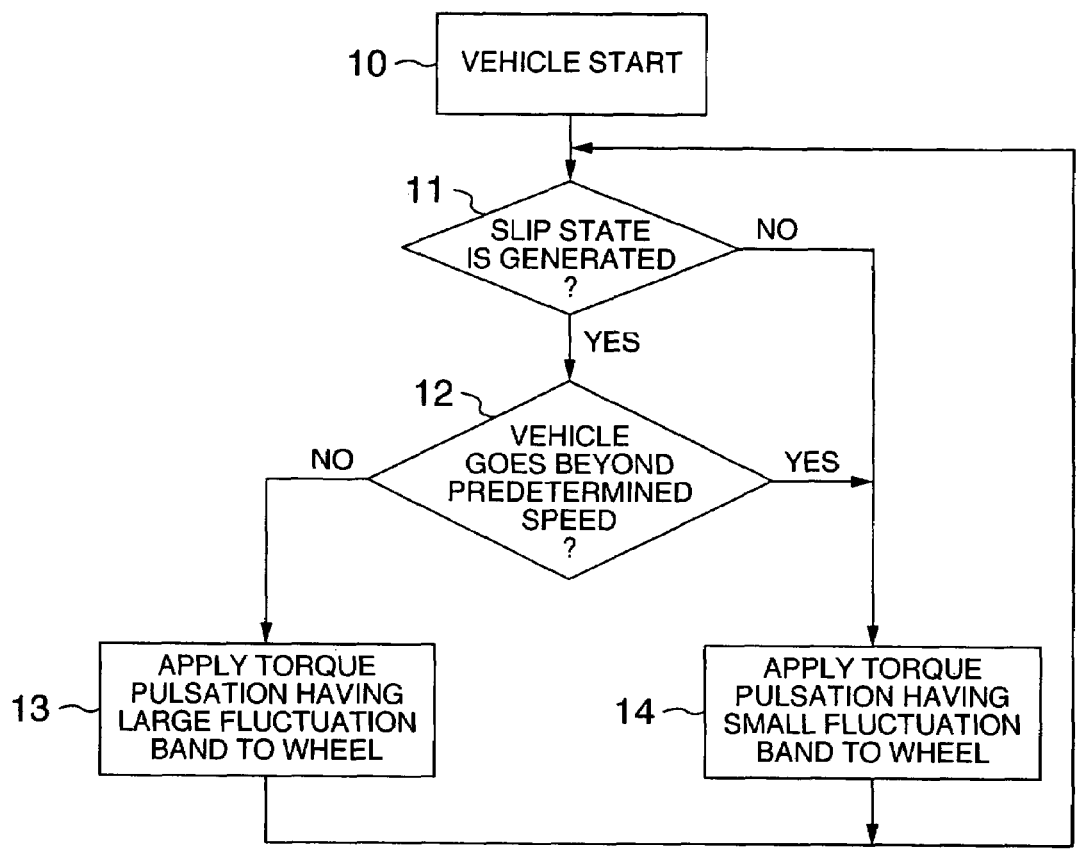
FIG. 7 shows an example of a flow chart for determining the fluctuation band of the torque pulsation.

FIG. 7 shows an example of a flow chart for determining the fluctuation band of the torque pulsation. In this flow chart, a judgment of a slip state is executed in a step 11 after a vehicle start in a step 10. If the vehicle is in the slip state, the vehicle velocity is judged in a step 12, and if the vehicle velocity is below a predetermined one, a torque pulsation having a large fluctuation band is applied to the wheels in a step 13. If the vehicle is not the slip state, or the vehicle velocity is over the predetermined one, a step 14 applies the torque pulsation having a small fluctuation band to the wheels.

In this case, after the vehicle start in the step 10, the process may go to the step 13 without executing the judgment in the step 11 and the step 12, thereby applying the torque pulsation having the large fluctuation band to the wheel, and thereafter, go to the step 11.

Further, in the step 11, the process may go to the step 12 in the case that the angular velocity or the angular acceleration of the wheel comes close to the value of judging for the slip state and the vehicle is going to be in the slip state, in addition to the current slip state. Further, by providing a sensor for detecting the state of the wheel and the road surface, the process may go to the step 12 in the case that a friction coefficient is low and a possibility of slip is high such as the case that the wheel and the road surface are wet.

Further, in the case that the slip state is judged in the preceding cycle, and it is judged in the step 11 whether or not the state changes to the grip state, the grip state may be judged in the case that the angular velocity or the angular acceleration of the wheel becomes lower at a certain degree than the value judging the slip state. It is possible to prevent a chattering between the slip state and the grip state by differentiating the references of the judgment of the slip state and the judgment of the grip state.

Further, in the case that the slip state is judged in the preceding cycle, and it is judged in the step 11 whether or not the state is changed to the grip state, the process may go to the step 14 after the grip state continues for a predetermined time.

Further, in the step 12, the velocity of the wheel may be judged in place of the velocity of the vehicle.

Further, in the case that it is judged in the preceding cycle that the vehicle or the wheel is below the predetermined velocity, and it is judged in the step 12 whether or not the vehicle or the wheel gets over the predetermined velocity, the process may go to the step 14 after the state of being over the predetermined velocity continues for a predetermined time.

Further, it may be set that the process does not go to the step 14 for a predetermined time after the vehicle is changed from the state in which the fluctuation width of the torque pulsation is small, to the state of the step 13 in which the fluctuation width of the torque pulsation is large, and it may be set that the process does not go to the step 13 for a predetermined time after the vehicle is changed from the state in which the fluctuation width of the torque pulsation is large, to the state of the step 14 in which the fluctuation width of the torque pulsation is small. In accordance with the structure mentioned above, it is possible to prevent the chattering between the slip state and the grip state.

Further, the magnitude of the fluctuation width of the torque pulsation may be determined only in the step 11 while omitting the step 12, or the magnitude of the fluctuation width of the torque pulsation may be determined only in the step 12 while omitting the step 11.

Further, the fluctuation width of the torque pulsation may be made small at a time when a predetermined time passes after the fluctuation width of the torque pulsation is enlarged.

Further, by providing a switch or the like, a driver may change the fluctuation width of the torque pulsation.

Further, in the case that the maximum value of the generated torque becomes large by enlarging the torque pulsation, the torque pulsation may be enlarged at a time when an instantaneous torque is necessary such as getting out of a stack or the like. The case that the maximum value of the generated torque becomes large by enlarging the torque pulsation includes, for example, a case that a drive wave form of the ac motor is formed as a rectangular wave, a case that each of motor shafts is arranged at one of the phases intensifying the cogging torques of the motors with each other in the system of driving one output shaft on the basis of the combination of the powers generated by two or more motors, a case that the ignition timings of the respective cylinders are changed, a case that the fuel injection amount is changed per the cylinder, and the like.

As mentioned above, in accordance with the present embodiment, it is possible to enlarge the vehicle driving force in the slip state. Further, there is obtained an effect that the vehicle is accelerated so as to easily grip it on the basis of the enlargement of the vehicle driving force. Further, it is possible to suppress the vibration and the undesired sound in the state of the grip state or at a time of traveling at a high velocity.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A drive unit for a vehicle, comprising a power source, and power transmission configured to transmit power generated by the power source to a wheel, in which a torque applied from the power source to the wheel is pulsated
   wherein the unit is configured so that a fluctuation band of a torque pulsation applied to said wheel is enlarged at a vehicle start time, and the fluctuation band is reduced after the vehicle or the wheel exceeds a predetermined velocity, or after a certain time has elapsed from the enlargement of the fluctuation band.

2. A vehicle drive unit as claimed in claim 1, wherein a torque pulsation change switch is provided, and the fluctuation band of the torque pulsation applied to said wheel is changed in correspondence to an operation of the switch.

3. A vehicle drive unit as claimed in claim 1, wherein an ac motor is provided as said power source, and the fluctuation band of the torque pulsation applied to said wheel is changed by changing a drive wave form of said ac motor.

4. A vehicle drive unit as claimed in claim 1, wherein an electric motor is provided as said power source, and the fluctuation band of the torque pulsation applied to said wheel is changed by changing a number of stators circulating an electric current of said electric motor.

5. A vehicle drive unit as claimed in claim 1, wherein said drive unit is provided with two or more electric motors as said power source, as well as means for driving one output shaft on the basis of a combination of powers generated by said two or more electric motors and transmitting the power applied to the output shaft to said wheel as said power transmission means, and the fluctuation band of the torque pulsation applied to said wheel is changed by changing a phase of at least one said electric motor with respect to said output shaft so as to intensify cogging torques of said respective electric motors with each other and drive said output shaft, or by negating said cogging torques with each other so as to drive said output shaft.

6. A vehicle drive unit as claimed in claim 1, wherein a velocity of said wheel is pulsated in place of pulsating the torque applied to said wheel.

7. A vehicle drive unit as claimed in claim 2, wherein a velocity of said wheel is pulsated in place of pulsating the torque applied to said wheel.

8. A vehicle drive unit as claimed in claim 3, wherein a velocity of said wheel is pulsated in place of pulsating the torque applied to said wheel.

9. A vehicle drive unit as claimed in claim 4, wherein a velocity of said wheel is pulsated in place of pulsating the torque applied to said wheel.

10. A vehicle drive unit as claimed in claim 5, wherein a velocity of said wheel is pulsated in place of pulsating the torque applied to said wheel.

* * * * *